(12) United States Patent
Yoshikuni et al.

(10) Patent No.: US 6,973,806 B2
(45) Date of Patent: Dec. 13, 2005

(54) METHOD OF MANUFACTURING A GLASS GOB

(75) Inventors: Keisuke Yoshikuni, Sagamihara (JP); Atsushi Uezaki, Oume (JP); Youji Touma, Higashikurume (JP); Shogo Tsukada, Hamura (JP)

(73) Assignee: Hoya Corporation, Tokyo (JP)

( * ) Notice: Subject to any disclaimer, the term of this patent is extended or adjusted under 35 U.S.C. 154(b) by 480 days.

(21) Appl. No.: 09/955,169

(22) Filed: Sep. 19, 2001

(65) Prior Publication Data

US 2002/0062660 A1 May 30, 2002

(30) Foreign Application Priority Data

Sep. 21, 2000 (JP) ....................................... 2000-286454

(51) Int. Cl.$^7$ .............................................. C03B 35/00
(52) U.S. Cl. ...................................... 65/25.1; 65/182.1
(58) Field of Search ........................... 65/25.1, 64, 102, 65/182.1

(56) References Cited

U.S. PATENT DOCUMENTS 5,873,921 A    2/1999   Hirota et al.

FOREIGN PATENT DOCUMENTS

| JP | 2-34525 | 2/1990 |
|----|---------|--------|
| JP | 8-277132 | * 10/1996 |
| JP | 9-221328 | * 8/1997 |

* cited by examiner

*Primary Examiner*—Dionne A. Walls
(74) *Attorney, Agent, or Firm*—Sughrue Mion, PLLC (57) ABSTRACT

In a method of manufacturing a glass gob, a down-flowing molten glass is received on a molding die. The molding die is moved down at a speed higher than a down-flowing speed of the molten glass so as to cut the molten glass. The molten glass is remained with a predetermined weight on the molding die. The molten glass is sprayed with gas in order to form the glass gob under such a condition that the molten glass is floated or slightly floated. The receiving step is carried out by spraying the molten glass with gas having a flow rate lower than the gas used in the spraying step, or the receiving step is carried out without performing the gas spraying.

9 Claims, 6 Drawing Sheets

METHOD OF MANUFACTURING A GLASS GOB

BACKGROUND OF THE INVENTION

This invention broadly relates to a method and an apparatus for manufacturing a glass gob having a predetermined weight by the use of a molten glass. Further, this invention is generally directed to a method for manufacturing a molded glass product by reheating and press-molding the glass gob. Moreover, this invention is concerned with a method for manufacturing an optical device or element by grinding or abrading and polishing the molded glass product.

As a process for manufacturing a molded glass product such as optical glass device or element, there has been known an RP (Reheating/Pressing) method. Such an RP method, a glass gob having a predetermined weight is heated to a predetermined temperature capable of a press molding treatment, thereby performing a press molding treatment to press mold the reheated glass gob. The press molding materials to be processed in the RP method are usually those obtained by cutting a glass plate into a plurality of glass pieces and then subjecting the glass pieces to a rough polishing treatment (called barrel grinding) so as to treat the surfaces thereof. On the other hand, in the process of cutting a glass plate into a plurality of glass pieces for being subsequently subjected to a pressing treatment, it will be difficult for all the glass pieces to have a uniform weight, thus undesirably making one glass piece to have a different weight from that of another. For this reason, in order to ensure a uniform weight for all the glass pieces, a large amount of glass material will have to be removed by virtue of barrel grinding.

In order to solve the above-mentioned problem called weight irregularity, the applicant of the present invention has suggested in its previous patent application an improved method called down-moving cutting, which requires that an mount (predetermined weight) of molten glass be poured into molding dies (which molten glass will be formed into a press molding material), but not involving a cutting process for cutting a glass plate into a plurality of glass pieces (Japanese Unexamined Patent Application Publication No. 2-34525). In such a down-moving cutting process, at first, an amount of a molten glass is poured into molding dies. Then, the movable portion of each molding die is moved down at a speed higher than the flowing speed of the molten glass. In this way, each molten glass flow is cut into separated portions, so that an amount (predetermined weight) of molten glass is left on each molding die, and a gradual cooling may be performed to produce glass gobs which will later serve as press molding material, thereby obtaining glass gobs having various shapes. Usually, a molding apparatus using the down-moving cutting method is equipped with a plurality of molding dies, so that the molten glass may be supplied to these molding dies successively, thereby continuously producing glass gobs.

However, in the above-discussed conventional down-moving cutting method, since the molten glass being supplied to a molding die is in contact with the molding surface of the molding die, it is necessary to avoid the formation of some defects such as through holes and cracks on the surfaces of molded glass gobs. For this reason, in the case where the down-moving cutting method is employed, it is necessary to supply a floating gas such as a nitrogen gas or an air to the molding surface of the molding die, with such a floating gas passing through a plurality of ejection openings formed on the molding surface. In this manner, the molten glass can be maintained in a floated or a slightly floated state, making it possible to minimize the possibility for the molten glass to get in contact with the molding surface of the molding die. In order to satisfy these requirements, the conventional down-moving cutting method has been so improved that the floating gas being supplied from a gas supply source is branched into several gas flows so as to be supplied to the respective molding dies, and that each gas flow is sufficient in its amount so as to effect a sufficient contact between the molten glass and the molding surface of each molding die. In fact, each gas flow is ejected outwardly through the ejection openings formed on the molding surface of each molding die, with such gas ejection being continued from the arrival of the molten glass at the molding surface until the take-out of the molded glass gob from each molding die. In particular, during molten glass supplying process (which will sometimes be referred to as casting process in the following description), since the molten glass is most likely to get in contact with the molding surface of a molding die, the flow rate of each floating gas is increased and this is supposed to be effective for solving the aforementioned problems.

However, in the case where the flow rate of the floating gas has been set in accordance with the aforementioned requirements, and during the casting process for casting the molten glass, the behavior of the molten glass at the moment the molten glass gets in contact with the molding die will become extremely violent, thus resulting in some internal defects (such as foldouts and strias). In order to solve this trouble, the inventors of the present invention have found that it is necessary to perform a control of the flow rate of the floating gas, and that such a control should satisfy the flowing two requirements in order to stabilize a molding state when using the above-described down-moving cutting method.

(1) When the molding dies are used to mold the molten glass, there should be no irregularity in the flow rates of the floating gas flows being supplied to the respective molding dies, and the flow rate of each floating gas flow should be so sufficient that it is sure to float the molten glass from each molding die.

(2) During the casting process of the molten glass, the flow rate of each floating gas flow should be so set that at the moment an amount of molten glass is received into a molding die, the molten glass should have no unstable behavior.

SUMMARY OF THE INVENTION

It is therof an object of the present invention to provide a method of and an apparatus for manufacturing glass gobs, capable of setting a correct floating gas flow rate necessary for carrying out a stable floating molding process, obtaining a stabilized casting condition, thereby making it possible to produce glass gobs having a high quality and a reduced weight irregularity.

It is another object of the present invention to provide a molded glass product manufacturing method in which the aforementioned glass gobs are at first reheated and then subjected to a press molding treatment so as to produce molded glass products. A further object of the present invention is to provide an optical element manufacturing method in which the aforementioned glass molded products are abraded and polished so as to produce various optical elements.

In order to achieve the above objects, a glass gob manufacturing method of the present invention comprises a first step of receiving a down-flowing molten glass on molding dies, a second step of moving down the molding dies at a speed higher than the down-flowing speed of the molten glass so as to cut the molten glass into separated portions and thus leave a predetermined weight of the molten glass on each of the molding dies, and a third step of spraying the molten glass with a gas flow so as to form the glass gobs under a condition in which the molten glass is floated or slightly floated. In particular, the first step is carried out by spraying the molten glass with a gas flow having a flow rate lower than that of the gas flow used in the third step, or the first step is carried out without performing the gas spraying.

According to the experiments conducted by the inventors of the present invention, even if the temperature of the molten glass during the casting process is relatively high and even if the surface shapes of the molding dies in contact with the molten glass are transferred to the molten glass, it has become quite clear that if the contact time is short and if the molten glass is floated, the surface shape of the molten glass will soon return back to its original shape due to a surface tension. Thus, according to the method of the present invention, in the case where the flow rate of the gas flow in the above first step has been reduced, the molten glass will get in contact with the molding dies during casting process. However, if the flow rate of a subsequent gas flow is increased, the molten glass can be floated or slightly floated, thereby rendering the surface of the molten glass to return to its original state. On the other hand, if the flow rate of the gas flow during the casting process is decreased or even reduced to zero, it is possible to inhibit the violent behavior of the molten glass, thereby making it possible to manufacture glass gobs free from any internal defects such as foldouts and strias which would otherwise be caused due to the violent behavior of the molten glass.

At this time, a time interval lasting from the start of the first step until the start of the third step is set to be one second or shorter.

Preferably, the gas flow rate in the first step is 5 to 20% of the gas flow rate in the third step, more preferably 5 to 15%, further preferably 7 to 14%.

Specifically, it is preferred that the first step is so performed that a molten glass having a viscosity of 30 to 2 poises is received into the molding dies.

Moreover, the method of the present invention further comprises a fourth step of taking out the glass gobs from the molding dies when the temperature of the glass gobs becomes equal to or lower than a glass transition point.

Further, the present invention provides a molded glass product manufacturing method which is characterized in that the glass gobs manufactured according to the aforementioned methods is at first reheated and then subjected to a press molding treatment, thereby producing molded glass products.

In addition, the present invention relates to an optical element (device) manufacturing method characterized in that the aforesaid method is used to manufacture optical element blanks which are later abraded (ground) and polished, thereby producing optical elements (devices).

Furthermore, the present invention also provides a glass gob manufacturing apparatus comprising molding dies each having a molding surface formed with a plurality of gas ejection openings, a molten glass supply means for supplying molten glass to the molding dies, a molding die up/down moving means capable of moving down the molding dies at a speed higher than the down-flowing speed of the molten glass so as to cut the molten glass into separated portions and thus leaving a predetermined weight of the molten glass on each of the molding dies, a gas supply means for supplying a gas to be ejected from the ejection openings of the molding dies, an adjustment means for adjusting the flow rate of a gas flow ejected from the ejection openings of each molding die, said adjustment means being capable of adjusting the flow rate of a gas flow at a time the molten glass flow is supplied to a molding die, so that the gas flow rate at this time is lower than another gas flow rate at another time when a predetermined weight of the molten glass has been left on the molding die.

In this case, the gas flow rate adjustment means comprises a gas flowing path allowing the gas supplied from the gas supply means to escape through other openings than the ejection openings of the molding dies, a flowing path opening/closing means which operates to open the gas flowing path when the molding dies have been raised up by virtue of the molding die up/down moving means, and to close the gas flowing path when the molding dies have been lowered down by virtue of the molding die up/down moving means.

DESCRIPTION OF PREFERRED EMBODIMENTS (Apparatus for Manufacturing Glass Gobs)

Figure 1:
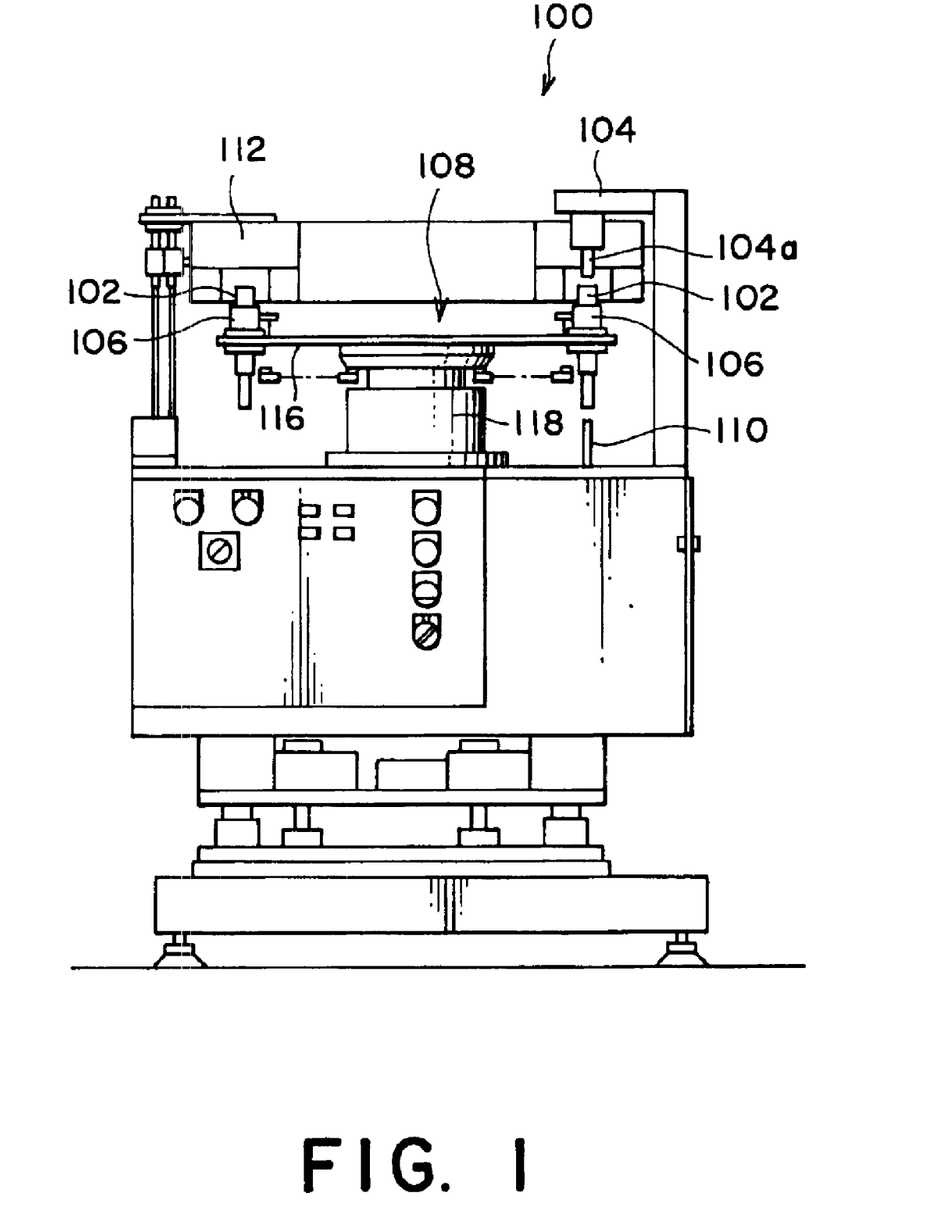
FIG. 1 is a side elevation showing an apparatus for manufacturing glass gobs.
Figure 2:
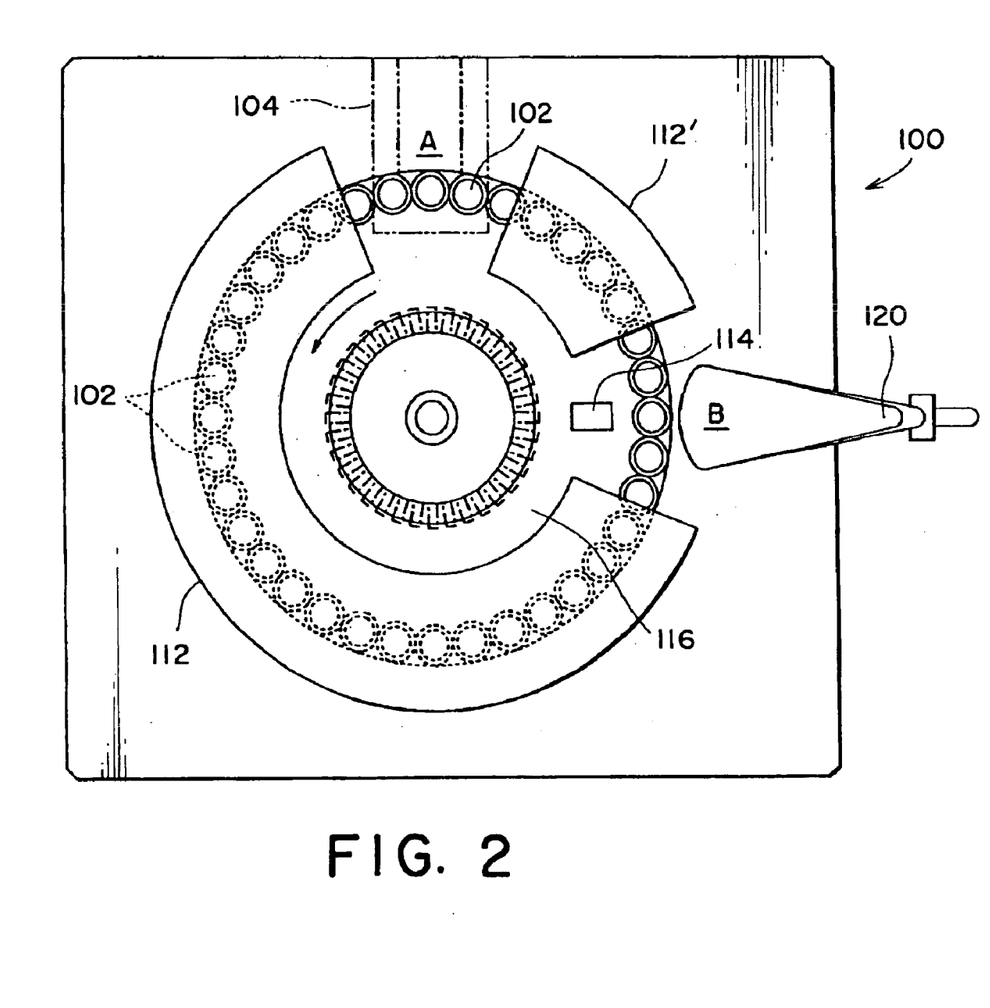
FIG. 2 is a plan view showing the glass gob manufacturing apparatus.

In the following, the present invention will be described in detail on the base of one embodiment shown in the drawings. As illustrated in FIG. 1 and FIG. 2, the glass gob manufacturing apparatus has a plurality of molding dies mounted on a turntable. When an amount (predetermined weight) of molten glass is successively supplied to the molding dies, it is possible to continuously manufacture a great number of glass gobs.

As shown in FIG. 1 and FIG. 2, the glass gob manufacturing apparatus 100 comprises a plurality of molding dies 102 each capable of at first receiving an amount of molten glass having a predetermined viscosity and then performing a molding process under a condition where the molten glass is floated or slightly floated, a molten glass supply section 104 for supplying an amount of molten glass to each molding die 102, a plurality of molding die bases 106 provided corresponding to the respective molding dies for supporting these molding dies, a molding die transporting section 108 capable of successively transporting the molding dies, a molding die up/down driving section 110 for vertically moving a plurality of molding dies in a position (hereinafter, referred to as casting position A) receiving the molten glass supplied hereto, a heating furnace 112 for gradually cooling the molded glass gobs, a discharge device 114 for discharging the gradually cooled glass gobs from the molding dies.

The molten glass supply section 104 is located in the casting position A, while the molten glass flow (not shown, but dissolved in a dissolving furnace) is supplied to the molding dies 102 by way of a flow-out nozzle 104*a*. The flow-out nozzle 104*a* of the molten glass supply section has a temperature control device (not shown), so that the molten glass flow can be controlled to a predetermined viscosity when flowing out. By virtue of such temperature control, it can be made sure to properly control the productivity of the glass gobs. Here, as a preferable example, the aforementioned temperature control is performed in a manner such that the viscosity of the molten glass flowing out of the nozzle 104*a* can be controlled at 30 to 2 poises, preferably 20 to 5 poises.

The molding die transporting section 108 has a turntable 116 for supporting the plurality of molding dies 102 through the molding die bases 106, and also has a driving section 118 for rotatably driving the turntable 116. Preferably, the turntable 116 is made into a circular plate (in the present embodiment, its diameter is 500 mm and its thickness is 15 mm) formed by an aluminum alloy, so that it is light in weight. In practice, the turntable is rotatably driven by a direct-drive-motor contained within the driving section 118. The turntable 116 is surrounded by thirty six molding die bases arranged along the outer circumference of the turntable 116 and separated from one another at an equal interval. Each molding die base 106 is provided to mount a molding die 102.

When the turntable 116 is turned by virtue of the molding die transporting section 108, each molding die 102 can be moved to the casting position A. Upon arriving at the casting position, the each molding die is caused to stop for a short time period so as to receive a predetermined amount of molten glass. After receiving the molten glass, a molding die will be moved away from the casting position. Namely, the molding die transporting section 108 is intermittently driven by the direct-drive-motor, in a manner such that the turntable 116 can be turned and stopped alternatively, with each turning continued for only a predetermined angle (this may be referred to as an intermittent index manner). In this way, when the turntable 116 is rotatably driven in an intermittent index manner, one molding die 102 mounting a predetermined amount of the molten glass will be moved away from the casting position A, while at the same time another molding die 102 located immediately behind (not mounting the molten glass) is moved to the casting position A. By repeating these steps, the molten glass material continuously flowing out of the nozzle 104*a* of the molten glass supply section can be received on to the molding dies 102 successively without any stop. However, a process for supplying the molten glass material from the molten glass supply section 104 on to the molding dies 102 may be carried out by using a down-moving cutting method, as will be related in detail later.

As shown in FIG. 1, the molding die up/down driving section 110 is located in the casting position A, right under the molding die bases 106 fixed on the outer circumference of the turntable 116. In this manner, when the molten glass is supplied from the molten glass supply section 104 to the molding dies 102, the molding die up/down driving section 110 will be driven so as to vertically move a molding die 102 located in the casting position A. However, a mechanism provided for vertically moving the molding dies 102 will be described in detail later.

As shown in FIG. 2, the heating furnace 112 is located along the moving trace of the molding dies 102 mounted on the turntable 116, extending from the casting position A to a glass gob take-out position (hereinafter referred to as take-out position B), also extending from the take-out position B to the casting position A. Further, as shown in FIG. 1, the heating furnace 112 is arranged in a manner such that it can cover the molding dies 102 from the upper sides thereof. In this way, the molding dies 102 passing through the heating furnace 112 can be heated by the heater contained within the heating furnace, while the molten glass materials mounted on the molding dies 102 and having a higher temperature than the heating temperature are gradually cooled. Preferably, the internal temperature within the heating furnace 112 is set at a range of 350 to 400° C., thereby gradually cooling the molten glass mounted on these molding dies 102 when they are moved from the casting position A to the take-out position B, thus producing the desired glass gobs. Further, another heating furnace 112' is located between the take-out position B and the casting position A in order to carry out a heating treatment and a heat-retaining treatment, so as to ensure that the temperature of the molding dies (from which the molten glass materials have been taken out) will not be too low.

A take-out device 114 is located in the take-out position B for discharging glass gobs (whose temperatures have become equal to or lower than the glass transition point Tg) from the molding dies 102. Namely, the take-out device 114 is provided to spray (from one side face of the molding dies 102) a gas onto the glass gobs mounted on the molding dies, so as to force the glass gobs to drop onto a recovery device 120 located opposite to the take-out device 114.

Next, description will be made to explain in detail the constructions of the molding die bases 106 and the molding dies 102, both of which are mounted on the turntable 116 with reference to FIG. 3 and FIG. 4.

Figure 3:
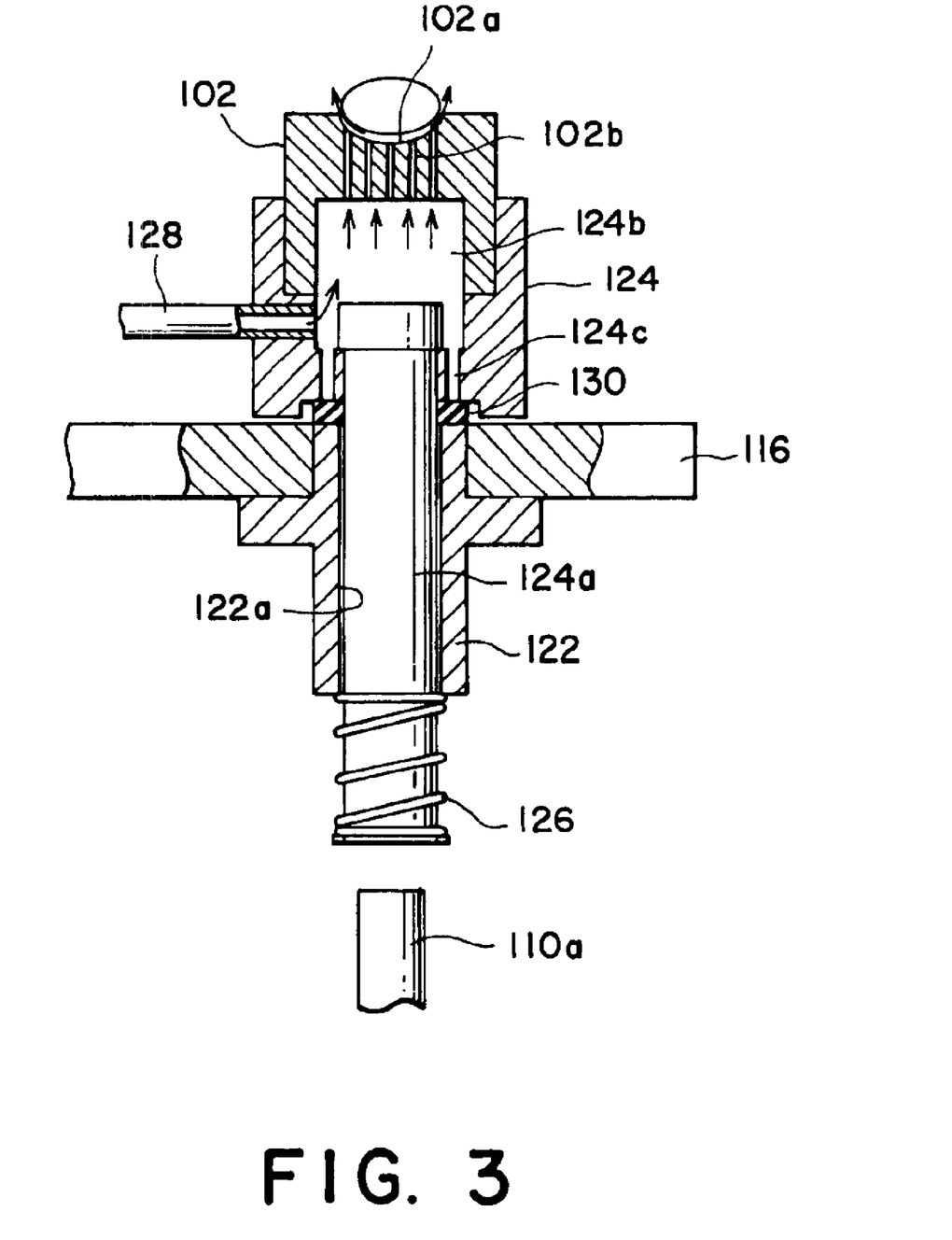
FIG. 3 is a side sectional view showing a molding die with its molding section moved down with respect to its molding base.
Figure 4:
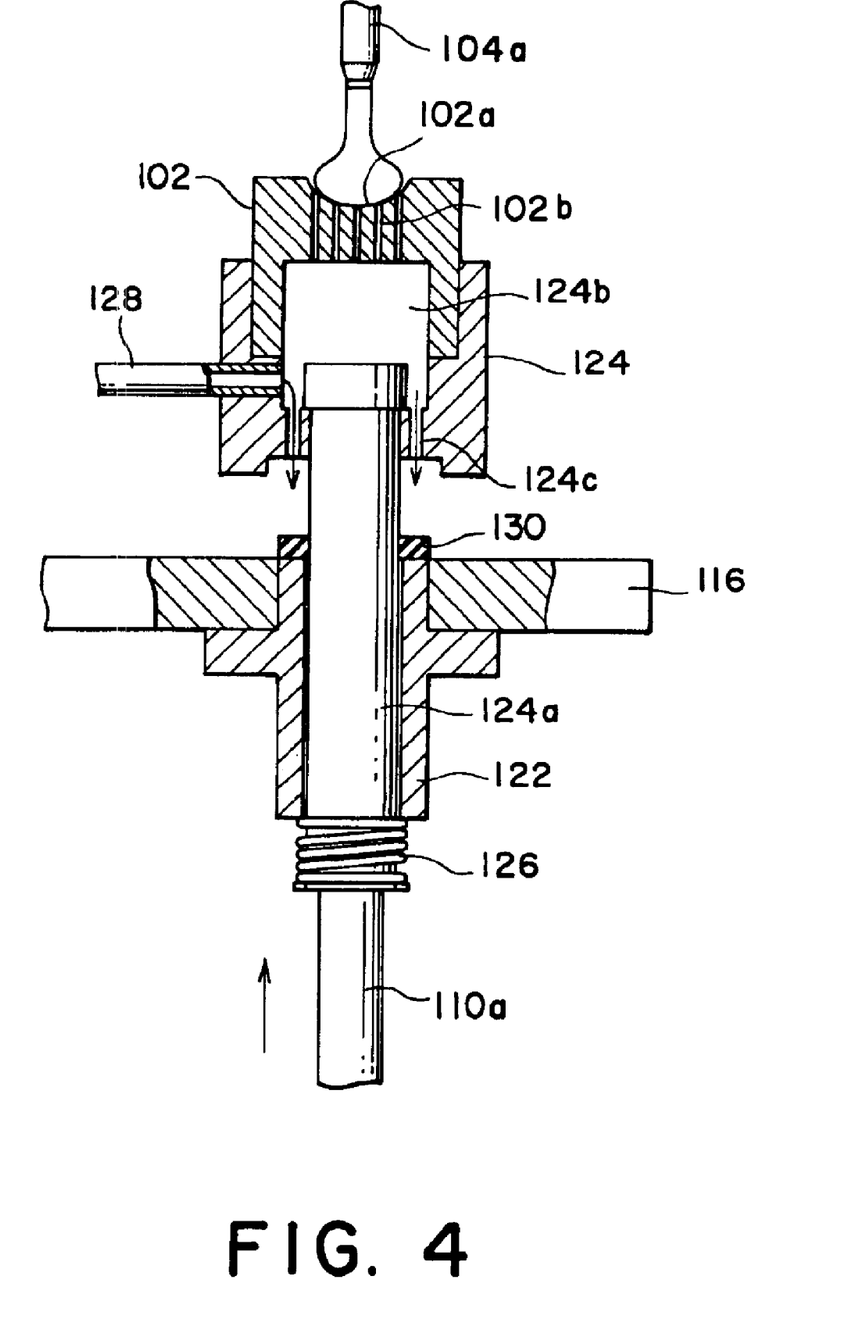
FIG. 4 is a side sectional view showing a molding die with its molding section moved up with respect to its molding base.

Specifically, FIG. 3 shows a condition in which a molding die 102 has been lowered down with respect to a molding die base 106, while FIG. 4 shows another condition in which the molding die 102 has been raised up with respect to the molding die base 106. As shown in these drawings, each molding die base 106 has a base section 122 fixed on the turntable 116, and also has a movable section 124 capable of mounting a molding die 102 and movable in the vertical direction with respect to the base section 122. In detail, the base section 122 is formed at the center thereof with a center hole 122*a* capable of slidably holding a shaft section 124*a* of the movable section 124. Actually, the shaft section 124*a* is projecting outwardly from the lower end of the center hole 122*a*. The projected lower end portion of the shaft section 124*a* is wound by a spring 126. In this manner, it is possible to ensure an acting force effective for constantly urging the movable section 124 in the downward direction.

The molding die up/down driving section 110 is provided under the molding die bases 106 and located in the molten glass casting position A. A driving shaft 110*a* of the driving section is extending upwardly to the lower end of the shaft section 124*a* of movable section. During the casting process of the molten glass, the molding die up/down driving section 110 is driven so that the driving shaft 110*a* is raised up in a manner shown in FIG. 4. At this time, the movable section 124 of the molding die base is moved up against the spring force of the spring 126. As a result, the molding die 102 is raised up to a position close to the nozzle 104*a* of the molten glass supply section, thereby allowing the molten glass to be supplied to the molding die.

In fact, the glass gob manufacturing apparatus 100 of the present embodiment utilizes a down-moving cutting method which is supposed to be effective for stably producing glass gobs each having a predetermined weight. As discussed in the above, once a molding die 102 is moved to the casting position A, the molding die up/down driving section 110 will start to operate so that its driving shaft 110*a* can upwardly press the movable section 124 of a molding die base 106. If there is not such an upward pressing force produced by the driving shaft 110*a* the spring force of the spring 126 will urge the movable section 124 in the downward direction and keep it at a certain low position. Here, since the driving shaft 110*a* is operated to move in the upward direction, the movable section 124 will be pressed in the upward direction against the spring force of the spring 126. As a result, both the movable section 124 and the molding die 102 will be raised up, rendering the molding surface 102*a* to get close to the flow-out nozzle 104*a*. Preferably, an interval distance between the front end of the flow-out nozzle 104*a* and the upper end of the molding die 102 is 5 to 10 mm.

In this event, a gas flow (which is used for floating or slightly floating the glass gob) is supplied to each of the thirty six molding dies 102 mounted on the turntable 116 through the molding die bases 106. The gas supplied from a gas source (not shown) is branched into a plurality of gas flows so as to flow into a plurality of gas pipes 128 communicated with the molding dies 102. In this way, the flow rate of a gas flowing to one molding die can be made equal to the flow rate of a gas flowing to another molding die, thereby ensuring a uniform flow rate for all the gas flows towards the respective molding dies. At this moment, as shown in FIG. 3, the gas supplied from the gas source can be introduced through the gas pipes 128 into each space 124*b* formed within the movable section 124 of each molding die base, and ejected out through a plurality of ejection openings 102*b* communicated with a molding surface formed on each molding die 102. The gas ejected through the ejection openings 102*b* are caused to spray a glass gob staying on the molding surface, thereby floating or slightly floating the glass gob. Herein, the gas for floating or slightly floating the glass gob may be an inert gas such as an air or a nitrogen gas. Alternatively, it may also be possible to use a gas mixture containing both the air and the nitrogen gas.

Figure 5:
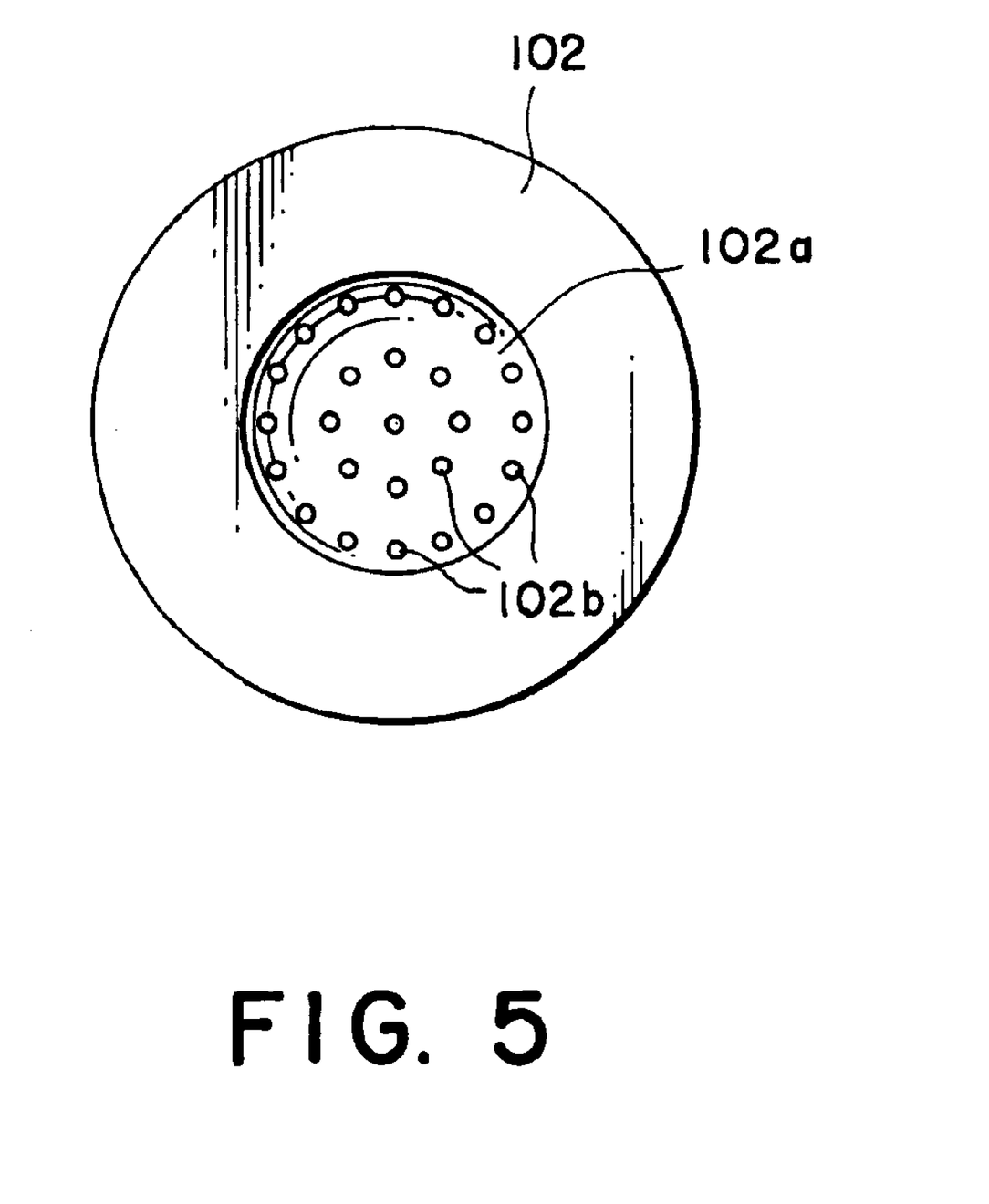
FIG. 5 is a plan view showing an array of gas ejection openings formed on a molding surface of a molding die, according to one embodiment of the present invention.
Figure 6A:
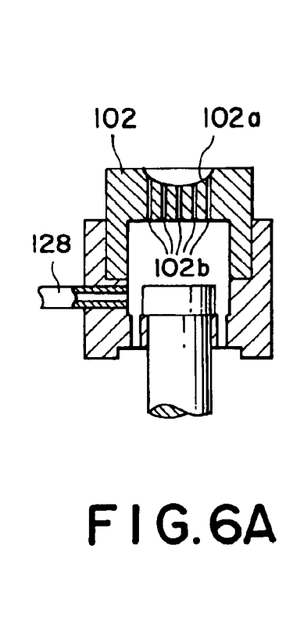
FIGS. 6A to 6E are conceptive views showing a procedure for carrying out a down-moving cutting method to supply a molten glass to a molding die, representing one embodiment of the present invention.
Figure 6B:
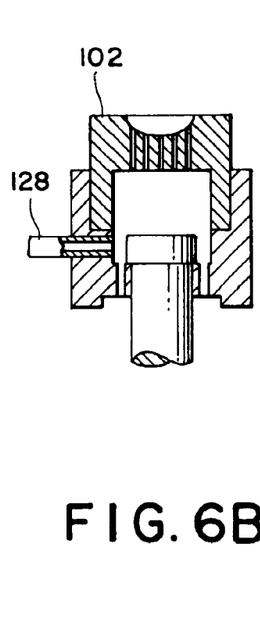
Figure 6C:
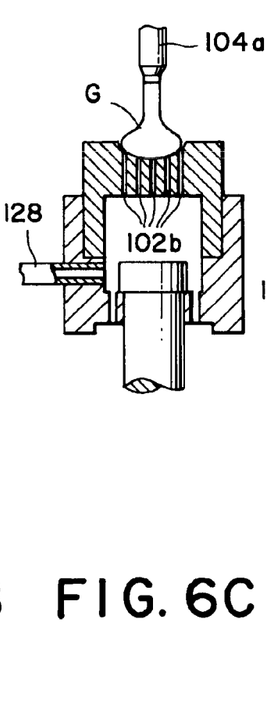
Figure 6D:
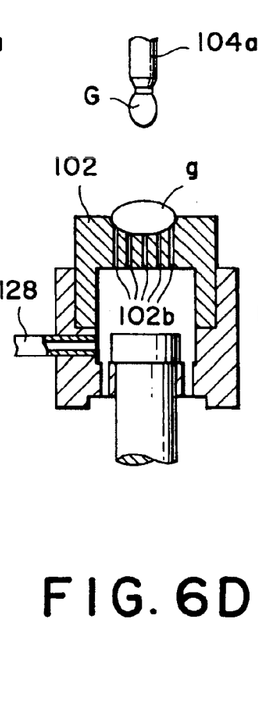
Figure 6E:
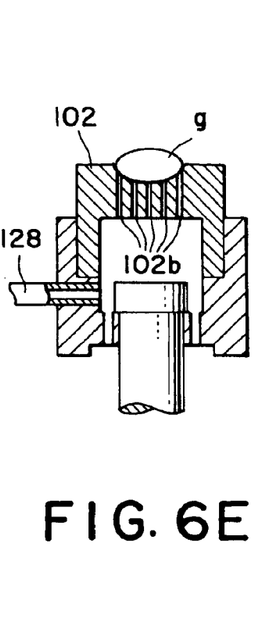

As shown in FIG. 5, the plurality of gas ejection openings 102*b* are arranged in the central area of the molding surface 102*a* and are separated from one another in the circumferential direction by an equal interval, thereby making it possible to float or slightly float (in a stable manner) the glass gob mounted on the molding surface 102*a*. However, the gas ejection openings 102*b* does not have to be limited to certain number, and it is in fact also possible to form and use only one gas ejection opening. Further, the molding surface may be formed by a porous material. Consequently, the numerous fine holes of the porous material may be used as gas ejection openings. However, in order to float or slightly float (in a stable manner) the molten glass or glass gob, it is preferable that a plurality of gas ejection openings 102*b* be distributed symmetrically around the center axis of the molding die. More preferably, the plurality of gas ejection openings 102*b* be arranged uniformly at an equal interval.

The movable section 124 of each molding die base 106 has a gas leaking hole 124*c* for leaking the gas from the internal space 124*b*. Further, a packing 130 is attached on the base section 122 of each molding die base 106, in a manner such that the packing 130 is in a position facing the leaking hole. Under a condition in which the movable section 124 is urged in the downward direction due to the spring force of the spring 126, i.e., when an amount of molten glass has been supplied to the molding die 102 and then the molding die is moved through the heating furnace 112 so that a glass gob is formed on the molding surface, the gas leaking opening 124*c* will be sealed by the packing 130 provided on the base section 122. In this way, an entire amount of the gas supplied via the gas pipe 128 to the internal space 124*b* can be moved towards the gas ejection openings 102*b*, and then ejected on to the molding surface 102*a*. On the other hand, as shown in FIG. 4, when the movable section 124 is pressed in the upward direction and the molding die 102 is in the casting position A, once the molten glass is received on to the molding surface, the gas leak hole 124*c* will be opened such that the gas will leak through the leak hole and thus the flow rate of the gas flowing through the gas ejection openings 102*b* will be reduced. Therefore, the apparatus of the present embodiment is not only simple in its structure, but also quite effective for reducing the flow rate of the gas flowing through the ejection openings 102*b* (such reduction is effected by virtue of the upward movement of the molding die). However, the control means for controlling the gas flow rate should not be limited to the above-described example, and it is also possible to control a gas flow rate adjustment valve by the use of an electric signal, so as to reduce the gas supply amount in response to the driving operation of the driving shaft.

As shown in FIG. 6, when a molding die is in the casting position A, and when the molding die up/down driving section 110 is in its driving movement, the molding surface of the molding die 102 will get close to the flow-out nozzle 104*a*. Thereby, the molten glass flow G can be supplied to the molding surface 102*a* (see FIGS. 6A to 6C). Then, upon the passing of a predetermined time period, the upward movement of the molding die (effected by the molding die up/down driving section 110) is released. In consequence, the spring force of the spring 126 of the molding die base will soon cause the movable section 124 to be pressed in the downward direction at a speed higher than a down-flowing speed of the molten glass. In this case, the molding die 102 is also separated from the flow-out nozzle 104*a* and lowered down rapidly to its original height (an original position prior to its rising). Herein, although the lower end of the molten glass G flowed out of the nozzle 104*a* is supported by the molding die 102 before the down-moving of the molding die 102, the rapid lowering of the molding die 102 will quickly release such support. As a result, the molten glass will be cut into separated portions in a position between the molten glass lower end g and the flow-out nozzle 104*a*. In this way, since the down-moving cutting method makes use of only a self-weight of the molten glass to effect the cutting action without using any cutter device, there is almost no cutting trace remaining on the molten glass (such a cutting trace will however remain on the molten glass if a cutter is used to effect such a cutting). Further, when an amount of the molten glass is to be moved on to the molding die 102, the molding die 102 will be moved only in the vertical direction. Accordingly, there would be almost no foldout formed on any molded glass gob when the molten glass 8 is cut into two portions.

With the use of the above-discussed down-moving cutting method, since it is possible to make constant a time period starting from a time point at which the molten glass (flowing out of the nozzle at a constant speed) is received into the molding die 102 to a time point at which the molding die is moved down, i.e., since it is possible to control a timing of cutting the molten glass by virtue of the molding die up/down driving section 110, it can be made exact for each molding die to receive a predetermined amount of the molten glass. Here, when the molten glass is supplied to the molding die, the gas leak hole 124c is opened. Thereby, the flow rate of the gas flowing out of the molding surface 102a will become extremely small. On the other hand, once the rising of the molding die 102a is released and the movable section 124 of the molding die base is returned to its original height, the gas leak hole 124 will again be sealed by the packing 130. Consequently, the flow rate of the gas being ejected out of the gas ejection openings 102b will be returned back to an original gas flow rate (before the rising of the molding die). Actually, an ejection amount of the gas passing through the gas ejection openings 102b is set to a value sufficient to float or slightly float the molten glass received in the molding die.

However, when the molding die 102 has gotten close to the flow-out nozzle 104a i.e., during the molten glass casting process, an ejection amount of the gas passing through the gas ejection openings 102b will be reduced (the gas flow rate may also become zero). Here, if the gas ejection amount is not reduced during the molten glass casting process, an upward pressure caused due to the gas being ejected out of the gas ejection openings 102b will be applied to the lower end of the molten glass (which has not reached a predetermined weight). As a result, the lower end of the molten glass will be undesirably oscillated in a violent manner, causing the molten glass to wet the front end of the flow-out nozzle. Consequently, it will be difficult to ensure a good quality for the internal structure of each molded glass gob (because foldouts and strias will occur), rendering it impossible to avoid the formation of glass gobs having strange shapes and irregular weights. In order to avoid all these problems, the present invention is characterized in that the gas ejection amount during the molten glass casting process is reduced so as to stabilize the molten glass, thereby making it possible to ensure a good quality for the internal structure of each molded glass gob, to avoid or at least alleviate the formation of glass gobs having strange shapes and irregular weights.

Preferably, a process (in which the molten glass flow is caused to at first get in contact with the molding surface 102a of the molding die, and then cut into two portions by virtue of a rapid down-moving movement of the molding die) should be completed within only one second, more preferably, the process should be completed within only 0.8 seconds. This is because although the molten glass is allowed to get in contact with the molding surface 102a of the molding die, a reduced gas ejection amount makes it possible to limit the above time to a shortened time period. In this way, since the molten glass (which has just flowed out of the nozzle) has only a low viscosity, such a low viscosity can be maintained if the above process is completed in a short time. Accordingly, during a later process in which the glass gobs are floated or slightly floated, the temperature of glass surface (whose temperature has been partially lowered down due to the contact with the molding surface) may be made equal to the temperature of glass surface not in contact with the molding surface, thereby making it sure to prevent the formation of through holes or cracks in the glass gobs.

However, a gas ejection amount passing through each molding die during the above glass gob formation process (in which glass gobs are formed by gradually cooling the molten glass on the molding dies 102) may be adjusted properly in accordance with the weight of each glass gob. For example, such a gas ejection amount can be adjusted to a value of 0.5 liter per minute. Further, a gas ejection amount passing through each molding die during the above casting process, is preferred to be set at a value which is 5 to 20% of the above gas ejection amount (during the gradual cooling of the molten glass), more preferably 5 to 15%, most preferably 7 to 14%.

When using the glass gob manufacturing apparatus described in the above, it is necessary to move the molding dies 102 at a high speed, so as to improve the productivity of the manufacturing of the glass gobs, and to ensure that the molten glass continuously flowing out of the nozzle at a constant speed can be exactly received by the molding dies which are moved successively to the casting position. For this reason, it is desirable that the turntable 116 be made of an aluminum alloy, and that each molding die be formed by a carbon material, thereby making these sections light in weight. Here, the carbon material will not get fused with the molten glass, but is light in weight and high in its strength. Moreover, it is desired that the turntable 116 be rotatably driven by a direct-drive-motor.

In fact, the molding surface 102a of each molding die 102 has been formed into a concave surface. In use, the molding surface is adapted to define the outer diameter of a mass of molten glass (when seen as a plan view). For example, when producing a press molding material for forming lens blanks each having a shape approximate to a final product, such a molding surface will not define the surface configuration (i.e., cross section of the molten glass) corresponding to the main surface of the lens. Namely, although each molding die can define the weight of each glass gob and the outer diameter thereof, it does not define the cross section of each glass gob. Therefore, the glass gobs obtained in the above-described method can be used as press molding materials, and are subjected to a heating treatment until they become considerably soft having a viscosity of $10^4$ to $10^8$ poises, followed by a press molding treatment, thereby making it possible to greatly change the shape of each glass gob, rendering it not necessary to have the cross section of each glass gob formed in accordance with the shape of a final pressed product (during the step of manufacturing glass gob).

(Glass to be Used)

The glass gobs produced by using the above-described apparatus are used as press molding materials in a precise press-molding process for manufacturing final products by means of press molding. Further, the same glass gobs may also be used as press molding materials in a reheating/pressing molding process in which the surfaces of the molded products obtained by reheating and press molding are abraded and polished so as to produce final products. When preparing materials for use in precise press molding, it is preferred to use a glass material whose glass transition point Tg is 580° C. This is because such glass material allows a relatively low temperature to be used as a pressing temperature, and also because such a glass material will not get fused with a press molding die.

Table 1 and Table 2 show some optical materials which in molten state can continuously flow out of the above flow-out nozzle and can then be made into glass gobs without losing a desired transparency.

TABLE 1

| Preferred Glass | Preferred Glass Composition | More Preferred Glass | Glass Transition Point (° C.) | Temperature Corresponding to Viscosity of 30-2 poises (° C.) |
|---|---|---|---|---|
| SiO2—TiO2 Optical Glass (containing SiO2 and TiO2 in amounts predominant over other components) | SiO2 (15–40 wt %) TiO2 (15–45 wt %) Na2O (0–25 wt %) CaO (0–10 wt %) BaO (0–30 wt %) ZrO2 (0–10 wt %) | Optical Glass Consisting of SiO2, TiO2, Na2O, CaO, BaO, ZrO2, Nb2O5 (No. 1 in Table 2) Optical Glass Consisting of SiO2, TiO2, Na2O, CaO, BaO, ZrO2, Nb2O5 (No. 2 in Table 2) | 580–700 | 1000–1150 |
| B2O3-La2O3 Optical Glass (containing B2O3 and La2O3 in amounts predominant over other components) | B2O3 (15–70 wt %) La2O3 (10–50 wt %) SiO2 (0–25 wt %) Gd2O3 (0–50 wt %) ZnO (0–56 wt %) BaO (0–50 wt %) SrO (0–40 wt %) CaO (0–25 wt %) MgO (0–20 wt %) Al2O3 (0–20 wt %) ZrO2 (0–10 wt %) TiO2 (0–10 wt %) Nb2O5 (0–15 wt %) WO3 (0–10 wt %) Y2O3 (0–20 wt %) Ta2O5 (0–30 wt %) | Optical Glass Consisting of SiO2, CaO, ZnO, ZrO2, Sb2O3 (No. 3 in Table 2) Optical Glass Consisting of B2O3, La2O3, SiO2, CaO, SrO, ZnO, ZrO2, As2O3 (No. 4 in Table 2) Optical Glass Consisting of B2O3, La2O3, SiO2, ZnO, Gd2O3, ZrO2, Nb2O5 (No. 5 in Table 2) Optical Glass Consisting of B2O3, La2O3, SiO2, Y2O3, Gd2O3, ZrO2, Nb2O5 (No. 6 in Table 2) Optical Glass Consisting of B2O3, La2O3, SiO2, BaO, Y2O3, Gd2O3 (No. 7 in Table 2) Optical Glass Consisting of B2O3, La2O3, SiO2, ZnO, Gd2O3, ZrO2, Nb2O5, Ta2O5, (No. 8 in Table 2) Optical Glass Consisting of B2O3, La2O3, SiO2, ZrO2, TiO2, Nb2O5, WO3, Sb2O3 (No. 9 in Table 2) Optical Glass Consisting of B2O3, La2O3, SiO2, Al2O3, BaO, ZnO, ZrO2,, Nb2O5, WO3 (No. 10 in Table 2) | 580–700 | 1000–1150 |

TABLE 2

| Sample No. | Glass | Tg (° C.) | Ts (° C.) | Temperature of Glass Flow (° C.) | Viscosity of Glass Flow (poise) | Glass Mass Forming Mold Temperature (° C.) | Cooling Temperature (° C.) | Reheating Temperature (° C.) | Viscosity upon Reheating (poise) | Weight Accuracy of Glass Mass (prior to polishing) | Rmax of Glass Mass Before Barrel Polishing | Rmax of Glass Mass After Barrel Polishing | Glass Products Prepared |
|---|---|---|---|---|---|---|---|---|---|---|---|---|---|
| 1 | SiO2—TiO2 | 615 | 650 | 1100 | 5 | 250–300 | 565 | 850 | 10⁵ | ±5% | upper surface | upper and | biconvex lens |
| 2 | SiO2—TiO2 | 620 | 660 | 1150 | 5 | 250–300 | 570 | 850 | 10⁵ | ±5% | 5–30 nm | lower | biconcave lens |
| 3 | B2O3—La2O3 | 640 | 670 | 1005 | 11 | 250–300 | 590 | 850 | 10⁵ | ±5% | lower | surface | plano-convex lens |
| 4 | B2O3—La2O3 | 645 | 675 | 1050 | 8 | 250–300 | 595 | 850 | 10⁵ | ±5% | surface | 40 μm | plano-concave lens |
| 5 | B2O3—La2O3 | 660 | 695 | 1035 | 10 | 250–300 | 610 | 860 | 10⁵ | ±5% | 3–60 nm | | convex-meniscus lens |
| 6 | B2O3—La2O3 | 680 | 710 | 1060 | 10 | 250–300 | 630 | 870 | 10⁵ | ±5% | | | concave-meniscus lens |
| 7 | B2O3—La2O3 | 680 | 710 | 1035 | 10 | 250–300 | 630 | 870 | 10⁵ | ±5% | | | |
| 8 | B2O3—La2O3 | 670 | 700 | 1035 | 10 | 250–300 | 620 | 870 | 10⁵ | ±5% | | | |
| 9 | B2O3—La2O3 | 590 | 625 | 950 | 10 | 250–300 | 540 | 800 | 10⁵ | ±5% | | | |
| 10 | B2O3—La2O3 | 625 | 665 | 950 | 14 | 250–300 | 615 | 870 | 10⁵ | ±5% | | | |
| 11 | B2O3—La2O3 | 570 | 600 | 950 | 8 | 250–300 | 520 | 720 | 10⁵ | ±5% | | | |
| 12 | SiO2—TiO2 | 550 | 585 | 930 | 7 | 250–300 | 500 | 700 | 10⁵ | ±5% | | | |

The viscosity of the molten glass flowing out of the above flow-out nozzle is preferred to be 30 to 2 poises, and it is preferable to use a glass material which in molten state has a temperature range of 900 to 1200° C. capable of ensuring the above viscosity. More preferably, the temperature range is 950 to 1200° C. Further preferably, the temperature range is 950 to 1150° C. In order to prevent the viscosity from becoming too high in the above temperature ranges, it is preferable that the content of $SiO_2$ be controlled at 50 wt % or less, more preferably the content of $SiO_2$ be controlled at 40 wt % or less. On the other hand, in order to prevent the viscosity from becoming too low in the above temperature ranges, it is preferable that the content of $B_2O_3$ be increased to 15 wt % or more, more preferably the content of $B_2O_3$ be increased to 20 wt % or more. In more detail, it is preferred to use the glass materials shown in Table 1, particularly to use the glass materials having compositions which are referred to as preferred compositions in the Table.

(Glass Gob Manufacturing Method)

In the following, description will be given to explain one embodiment of a glass gob manufacturing method involving the use of the above glass gob manufacturing apparatus. At first, an amount of $SiO_2$—$TiO_2$ optical glass material (glass No. 1 shown in Table 2) is melted in a melting furnace at a temperature of 1270° C. Then, after the glass melting process is completed, the molten glass is supplied from the melting furnace to the molten glass supply section 110. Afterwards, the molding dies 102 are heated to a temperature range of 250 to 300° C. by using the heating furnace 112, while the turntable 116 is continuously turned at a speed of 2.5 r.p.m. At this time, the front end of the flow-out nozzle 104a is controlled at a temperature of 1110° C., while the viscosity of the molten glass is found to be 5 poises.

In this event, the viscosity of the molten glass flowing out of the nozzle is preferred to be within a range of 30 to 2 poises, preferably within a range of 20 to 2 poises. By controlling the viscosity of the molten glass in the above ranges, it is allowed to obtain glass gobs having a high internal quality not containing any strias. In this way, an appropriate amount of molten glass can flow easily from the flow-out nozzle 104a. When a certain amount of molten glass has flowed out, a constriction will occur between the lower end of the flowed-out molten glass and the flow-out nozzle. In this case, if the weight of the lower end of the flowed-out molten glass is larger than the surface tension of the molten glass, the lower end portion of the flowed-out molten glass may be separated at the constriction from the main body thereof, thereby rendering it easy for each molding die to receive a predetermined amount of the molten glass without any necessity of using a cutter or cutter device. Further, the weight of the molten glass to be received by each molding die 102 may be easily adjusted by changing a timing of quickly moving down the molding die 102 which has already received the lower end of the molten glass. Moreover, after the amount of molten glass has been completely received into the molding die, it can be readily formed into a desired shape under such a condition that it is floated or slightly floated.

Thus, the molten glass flow is continuously supplied from the flow-out nozzle 104a under the above-described state. At this time, each molding die 102 is moved in the upward direction from its home position. Thereby, the molten glass flowing out of the flow-out nozzle 104a can be received onto the molding surface 102a of each molding die 102. Once a molding die 102 has received a predetermined amount of the molten glass on its molding surface 102a the molding die 102 is suddenly moved down, thereby cutting the molten glass which is just being supplied from the flow-out nozzle 104a. As an example, a necessary time period starting from the contact of the molten glass with the molding surface until the cutting thereof was 0.3 seconds. Actually, the weights of the glass gobs in the present invention are managed in order to obtain a uniform weight for each glass gob. Such a weight management is carried out by controlling the molten glass flow in a such manner that the molten glass flowing or dropping from the flow-out nozzle 104a at a constant flow rate can be received by each molding die 102 at a constant time interval. Further, during the process for supplying the molten glass, an amount of the gas being ejected from the molding surface is set to be 5 to 20% (preferably 5 to 15%, more preferably 7 to 14%) of a gas ejection amount when the molding die is in its home position. In this way, by controlling the gas ejection amount at this time to a value lower than a gas ejection mount when the molding die is in its home position, it is possible to inhibit an unstable behavior of the molten glass, thereby ensuring the production of glass gobs having a high internal quality, a good outer appearance and a high weight precision.

The setting of the weight of the glass gobs can be carried out in the following manner. At first, the temperature of the molten glass is set to a value that enables the molten glass to obtain a desired viscosity which can ensure the production of glass gobs not containing strias but having a high internal quality. Then, the flow rate of the molten glass flowing out of the nozzle during each time unit is determined and an appropriate flow-out nozzle 104a is selected which has an appropriate inner diameter (preferably $\phi$ is 1 to 5 mm, more preferably $\phi$ is 2 to 5 mm) capable of obtaining a desired flow rate. Further, a transporting speed (rotating speed of the turntable) for transporting the molding dies 102 is so set that an amount of the molten glass to be received by the molding dies 102 (moving from the molten glass flowing out of the nozzle at a certain constant speed) will be equal to a desired amount. Thus, if the viscosity of the molten glass is set within a range of 30 to 2 poises and if the transporting speed for transporting the molding dies 102 is adjusted, it is possible to properly make use of a timing for moving down a molding die 102 so as to set the molten glass cutting time at only 1 second, thereby rendering it possible to manufacture a large amount of glass gobs having a high weight precision, and enabling the manufacturing process to be carried out in a short time with a high productivity.

In the present embodiment, since it is not necessary to use a cutter device, a cutting trace (foldout) will not reach deep into the internal portion of each glass gob. More specifically, a trace (foldout) occurred when the molten glass is cut into two portions is existing only in a surface layer 0.5 mm (or less) apart from the outer surface of a glass gob. Such kind of trace can be readily removed by polishing the surface of each glass gob.

A typical shape of a glass gob obtainable in the above-mentioned method may be described in the following.

(1) Spherical body or its approximations (2) A shape having two projected surfaces connected with each other at a circumferential edge.

This corresponds to a marble shape or an elliptical shape rotational about its short axis. When a glass gob is seen as a plan view in such a manner that a portion defining its outer diameter corresponds to its circumferential edge, such a plan view may be circular or its approximations.

(3) A shape formed by upwardly floated liquid drops.

In this way, the molten glass in its floated or slightly floated state is moved within the heating furnace 112 along its circumferential direction, so as to be cooled gradually and thus formed into predetermined shape.

In this event, the cross section of the molten glass will not be restricted, but remains in an undefined state. The temperature of the cooled glass gobs is below a glass transition point Tg (615° C.), and these glass gobs are taken out upon their arrival at the take-out position, thereby making it possible to produce the glass gobs at a speed of 90 blocks per second. All the glass gobs obtained in the above-discussed process were observed but no defects such as through holes and cracks as well as internal quality defects such as strias were found. A weight irregularity was within ±5% (1000 glass gob samples were examined). Nevertheless, when the glass gobs obtained in the above are used as a material in a later preheating press molding process, it is preferable that the outer surfaces of the glass gobs be polished by virtue of barrel polishing treatment. By the use of the barrel polishing treatment, the surface of each glass gob can be made into a rough surface so as to improve an adhesion strength necessary for a die release agent (in powder state) to adhere to the surface during a reheating/pressing molding process. Moreover, the barrel polishing treatment is also effective for removing any sort of defects formed on the surface of each glass gob.

(Reheating/Pressing Molding Process)

The glass gobs obtained in the above-described process were subjected to a general press molding treatment using a plurality of press molding dies each having a molding surface corresponding to a shape of a finally formed lens. Herein, each press molding die comprises an upper mold and a lower mould, with the press molding process carried out in an air atmosphere. In fact, the glass gobs are heated to a temperature of about 850° C. so as to be in a softened state (having a viscosity of $10^5$ poises) and then introduced onto the molding surface (which has been heated to a temperature of about 650° C.) of the lower mold of each molding die. Subsequently, using the upper mold of each molding die (which has been similarly heated to a temperature of about 650° C.), the glass gobs were treated in a press molding process for about 4 to 5 seconds, thereby obtaining press molded products each having a shape approximate to a predetermined final product.

(Polishing Process for Treating Press Molded Products)

The press molded products obtained in the above reheating/pressing molding process were polished so as to produce optical lenses as final products. In this case, cerium oxide is used as a polishing agent to perform an initial rough polishing treatment and then a final polishing treatment, so as to completely remove defects such as strias remaining in the surface layers of the press molded products. Further, since the weight irregularity of the press molded products can be controlled and inhibited, it is allowed to reduce a total polishing amount, thereby making it easy to produce various optical glass products, such as a biconvex lens, a biconcave lens, a plano-convex lens, a plano-concave lens, a convex meniscus lens, a concave meniscus lens. Although defects will probably exist in the surface layers of the press molded products obtained in the above pressing process, these defects can be completely removed in the polishing process, thereby making it sure to obtain final glass products free from any defects. On the other hand, although the above-described glass gob producing process has used $SiO_2$—$TiO_2$ glass materials, it is also allowed to use $B_2O_3$—$La_2O_3$ glass materials so as to obtain the same effects. In practice, the glass materials Nos. 2 to 12 shown in Table 2 are used and various other steps are performed, thereby similarly obtaining various optical glass products such as a biconvex lens, a biconcave lens, a plano-convex lens, a plano-concave lens, a convex meniscus lens, and a concave meniscus lens.

Although the above description is related to a reheating/pressing molding process, the glass gobs obtained according to the method of the present invention can also be used as a molding material in a precise press molding process. At this time, the glass gobs obtained in the above process are reheated to a temperature ensuring a viscosity of $10^7$ to $10^{12}$ poises, followed by a pressing treatment, thereby precisely transferring the surface shape of the molding surface of each press molding die to the glass material, thus obtaining final glass products. However, an air atmosphere used in the press molding process is preferred to be a nitrogen gas or an inert gas, or a gas mixture containing both of them. Further, the glass for use in the precise press molding process is preferred to be a glass material whose glass transition point Tg is 580° C. or lower.

In this way, the molded products obtained in the above reheating/pressing molding process, the glass products such as optical elements obtained by abrading and polishing the surfaces of the molded products, as well as the precise press molded products, all have a high internal quality owning to a fact that the glass gobs serving as the press molding materials have a high internal quality. Further, since the weight irregularity of the glass gobs can be reduced, when such glass gobs are used in the reheating/pressing molding process, it is allowed to reduce a total amount of glass to be removed by barrel polishing, final abrading and final polishing, thereby making it possible to shorten a necessary processing time so as to improve the productivity. Further, since it has become possible to reduce a total amount of a glass material to be removed and discarded, it is allowed to reduce the production cost and to alleviate a pollution problem upon the surrounding environment. Thus, when the above glass gobs are used in the precise press molding process, its reduced weight irregularity has been proved to be useful for improving the shape precision of final products.

Although one embodiment of the present invention has been described in the above with reference to the accompanying drawings, the present invention should not be limited to such a specific embodiment. In fact, it is very clear that the present invention can be changed and modified in various manners without departing from the scopes as set forth in the appending claims. Further, it is quite obvious for an ordinary skill in the art to understand that the glass gob manufacturing method of the present invention can be carried out by using other manufacturing apparatuses than that described in the above embodiment (for example, using an apparatus not equipped with a turntable but is capable of transporting a plurality of molding dies in a generally linear movement.

As described in the above, with the use of the glass gob manufacturing method according to the present invention, it is allowed to reduce the amount of a floating gas during a casting process, thereby making it sure to stabilize the behavior of the molten glass in the casting. Meanwhile, since it is allowed to increase the flow rate of the floating glass during the glass gob molding process so as to float or slightly float the glass gobs, it has become possible not only to reduce internal quality defects (such as foldouts and strias) and alleviate weight irregularity of the glass gobs, but also to reduce outer appearance defects (such as through holes and cracks).

Further, with the use of the glass gob manufacturing apparatus formed according to the present invention, it has become possible to stabilize the behavior of the molten glass during the casting process, to alleviate the weight irregularity of the glass gobs produced by different molding dies, to reduce internal quality defects (such as foldouts and strias) and outer appearance defects (such as through holes and cracks).

Moreover, using the glass product manufacturing method and the optical element manufacturing method of the present invention, the glass gobs obtained in the above-described processes may be used to produce molded products and optical devises or elements each having an excellent internal quality.

What is claimed is:

1. A method of manufacturing a glass gob, comprising the steps of:

receiving a down-flowing molten glass on a molding die;

separating the molten glass with a predetermined weight from the flowing molten glass by rapidly lowering the molding die;

remaining the molten glass with the predetermined weight on the molding die; and spraying the molten glass with gas in order to form the glass gob under such a condition that the molten glass is floated or slightly floated, wherein the receiving step is carried out by spraying the molten glass with gas having a flow rate lower than the gas used in the spraying step.

2. A method as claimed in claim 1, wherein:

duration between the receiving step and the spraying step falls within a range of one second or shorter.

3. A method as claimed in claim 1, wherein:

the gas flow rate in the receiving step falls within a range between 5% and 20% for the gas flow rate in the spraying step.

4. A method as claimed in claim 1, wherein:

the molten glass has a viscosity between 30 and 2 poises.

5. A method as claimed in claim 1, further comprising the step of:

taking out the glass gob from the molding die when a temperature of the glass gob falls within a range of a glass transition point or lower.

6. A method of manufacturing a molded glass product, comprising the steps of:

reheating the glass gob manufactured by the method claimed in claim 1;

press-molding the glass gob so as to produce the glass molded products.

7. A method of manufacturing an optical device, comprising the steps of: manufacturing an optical device blank by the method claimed in claim 1; and grinding and polishing the optical device blank in order to produce the optical device.

8. A method as claimed in claim 1, wherein:

the glass gob is made of a molding material used in a precise press molding process.

9. A method as claimed in claim 8, further comprising the steps of:

reheating the molding material; and precisely press-molding the reheated molding material so as to produce glass molded products.

* * * * *